(12) United States Patent
Takahashi

(10) Patent No.: US 8,373,772 B2
(45) Date of Patent: Feb. 12, 2013

(54) IMAGING APPARATUS FOR CAPTURING A MAIN IMAGE AND A SUB IMAGE

(75) Inventor: Atsushi Takahashi, Osaka (JP)

(73) Assignee: Panasonic Corporation, Osaka (JP)

( * ) Notice: Subject to any disclaimer, the term of this patent is extended or adjusted under 35 U.S.C. 154(b) by 142 days.

(21) Appl. No.: 12/904,399

(22) Filed: Oct. 14, 2010

(65) Prior Publication Data

US 2011/0032387 A1 Feb. 10, 2011

Related U.S. Application Data

(63) Continuation of application No. PCT/JP2009/001918, filed on Apr. 27, 2009.

(30) Foreign Application Priority Data

Apr. 28, 2008 (JP) ................................. 2008-117725

(51) Int. Cl.
*G06K 9/36* (2006.01)
(52) U.S. Cl. .................................. 348/231.3; 348/231.99
(58) Field of Classification Search .................. 348/143, 348/207.1, 207.11, 208.14, 218.1, 231.99, 348/231.3
See application file for complete search history.

(56) References Cited

U.S. PATENT DOCUMENTS

| | | | |
|---|---|---|---|
| 6,919,927 B1 * | 7/2005 | Hyodo | 348/333.02 |
| 6,987,535 B1 * | 1/2006 | Matsugu et al. | 348/239 |
| 7,292,267 B2 * | 11/2007 | Prentice et al. | 348/207.1 |
| 2002/0168009 A1 * | 11/2002 | Sakaguchi | 375/240.16 |
| 2006/0007318 A1 * | 1/2006 | Kanayama et al. | 348/211.3 |
| 2006/0050331 A1 * | 3/2006 | Shigeeda | 358/474 |
| 2006/0093224 A1 | 5/2006 | Uchino | |
| 2007/0181687 A1 | 8/2007 | Fukushima et al. | |

FOREIGN PATENT DOCUMENTS

| | | |
|---|---|---|
| JP | 9-214836 | 8/1997 |
| JP | 2006-129152 | 5/2006 |
| JP | 2007-134845 | 5/2007 |
| JP | 2007-243909 | 9/2007 |
| JP | 2008-22306 | 1/2008 |
| JP | 2008-28747 | 2/2008 |

OTHER PUBLICATIONS

Chinese Official Action in Chinese Patent Application No. 200980113977.1, dated Jun. 25, 2012.
English language translation of JP Publication No. 2008-022306, published Jan. 31, 3008.

\* cited by examiner

*Primary Examiner* — Chieh M Fan
*Assistant Examiner* — Dwight C Tejano
(74) *Attorney, Agent, or Firm* — Greenblum & Bernstein, P.L.C.

(57) ABSTRACT

An imaging apparatus according to an implementation of the present invention is connected to a memory and includes: an imaging device reading any given area; a main image storage unit reading an image of a main image area, the image representing a whole image formed on the imaging device, and store in the memory an image associated with the read image as a main image; a sub image storage unit reading an image of a watch area from the imaging device, the watch area being an area to be watched, and store the read image in the memory as a sub image; an encoder encoding the main image and the sub image stored in the memory by the main image storage unit and the sub image storage unit; and a recording unit recording the main image and the sub image encoded by the encoder on a recording medium.

14 Claims, 14 Drawing Sheets

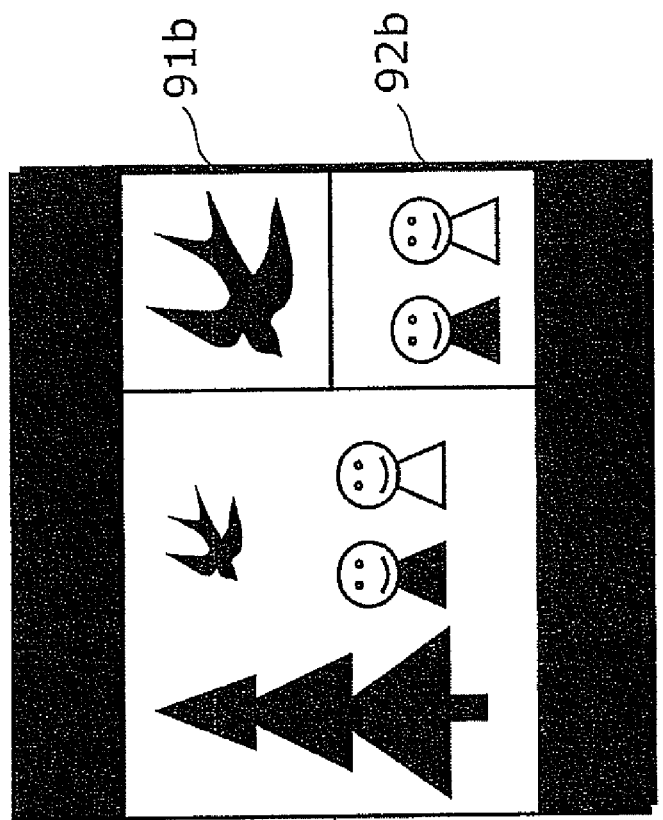
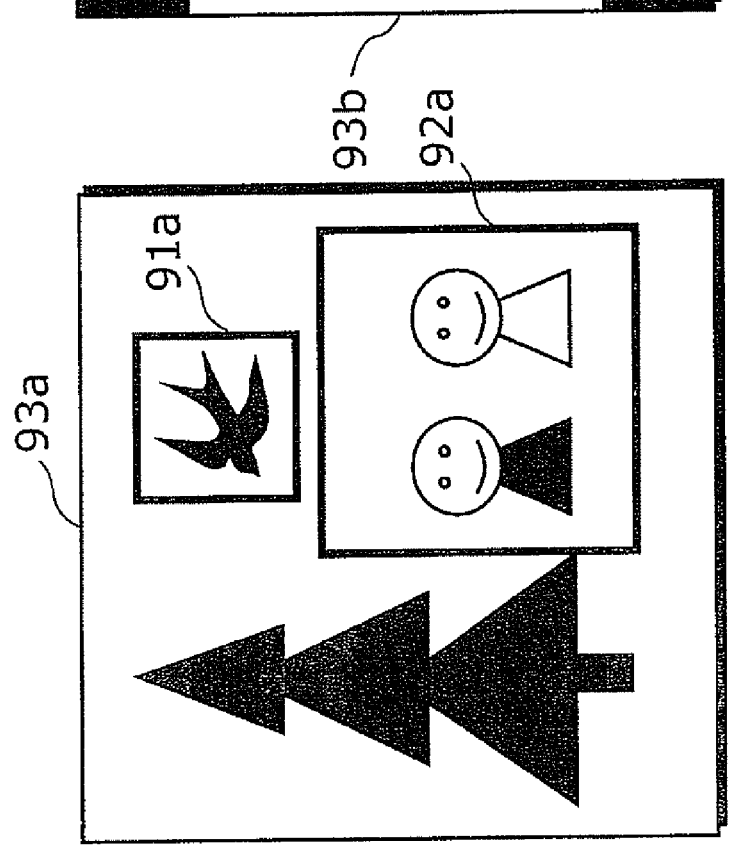

IMAGING APPARATUS FOR CAPTURING A MAIN IMAGE AND A SUB IMAGE

CROSS REFERENCE TO RELATED APPLICATION

This is a continuation application of PCT application No. PCT/JP2009/001918 filed Apr. 27, 2009, designating the United States of America.

BACKGROUND OF THE INVENTION (1) Field of the Invention

The present invention relates to imaging apparatuses, and in particular, to an imaging apparatus which employs a high-speed imaging device and a high-definition imaging device to obtain images at once out of one input image.

(2) Description of the Related Art

There are imaging apparatuses performing the following: employing a lens to form an image of an object on an imaging device; providing various kinds of signal processing to the image data obtained via photoelectric conversion; and displaying the image of the object on a liquid crystal monitor as well as recording the image in a recording medium. Such imaging apparatuses have been practically realized as digital still cameras and digital video cameras and have become widely available. A typical operation of such a camera involves a user of the camera deciding composition of the object to obtain the image for no more than one capturing objective such as: controlling the direction of the camera and the zooming; and capturing a scene in which a child of the user is playing. Furthermore, an operation of a stationary imaging apparatus, such as a surveillance camera, involves deciding composition of the object for no more than one capturing objective such as: controlling the direction of the camera and the zooming by remote control; and specifying a suspicious figure and a troubled site by image processing to automatically control the camera angle.

As an application technique of the above technique, proposed is a first imaging apparatus which is capable of achieving several capturing objectives with one camera (Patent Reference 1: Japanese Unexamined Patent Application Publication No. 2007-134845). Out of an image being obtained by the camera, the application technique (i) selects several watch areas including an object to be a watch target according to a prospectively set condition, and, furthermore, (ii) sets a degree of importance in the image for each of the corresponding watch areas. Then, the technique (i) integrates the several watch areas into an integrated watch area based on the degree of importance, and (ii) controls the camera so as to include the integrated watch area in the composition based on a measurement value of a sensor detecting a status of the camera.

As another application technique, proposed is a second imaging apparatus utilizing a surveillance technique which can always check the entire surveillance area, and at the same time, allows the user to make a detailed visual contact with a watch area (Patent Reference 2: 2006-129152). The technique (i) temporarily stores an image obtained by a camera in a first buffer, (ii) carries out a separate size conversion on the surveillance area and the watch area which are included in the first buffer, (iii) and re-stores the converted surveillance area and watch area in a second buffer. Accordingly, the surveillance area and the watch area which are re-stored in the second buffer are regarded as images to be recorded.

SUMMARY OF THE INVENTION

The application technique of the above conventional first imaging apparatus employs a degree of importance to determine composition to satisfy several capturing objectives at the same time. Thus, unfortunately, the technique cannot fully satisfy each of capturing objective. Suppose a child playing in a school open house performance, and his or her parent getting ready to capture the child. According to the application technique, the parent has to give up one of contradicting desires: capturing the entire stage or capturing the child up close. Concurrently, the other application technique is assumed to have the surveillance camera detect a problem in a distant location within the imaged area. Here, the other application technique has to choose either (i) giving a priority to obtain the entire picture of the problem or (ii) paying attention to each problem site.

The above conventional second imaging apparatus performs a cutout and a size conversion on the surveillance area and the watch area out of the obtained image temporarily stored in the first buffer. These cutout and size conversion cause (i) deterioration in picture quality, and (ii) an increase in the number of memory accesses and in capacity of a memory in use.

The present invention is conceived in view of the above problems and has an object to propose an imaging apparatus which can obtain images of different areas at once out of an input image provided by a single camera with less deterioration in picture quality.

In order to achieve the above object, an imaging apparatus according to an aspect of the present invention is connected to a memory and includes: an imaging device which reads any given area; a main image storage unit which reads an image of a main image area, the image representing a whole image formed on the imaging device, and store in the memory an image associated with the read image as a main image; a sub image storage unit which reads an image of a watch area from the imaging device, the watch area being an area to be watched, and store the read image in the memory as a sub image; an encoder which encodes the main image and the sub image stored in the memory by the main image storage unit and the sub image storage unit; and a recording unit which records the main image and the sub image encoded by the encoder on a recording medium.

The above structure allows the main image and the sub image to be recorded at once even in the case where the main image area and the watch area differ. In addition, the structure makes possible generating the sub image out of an image of the watch area before storing the image of the watch area. This allows the imaging apparatus to reduce deterioration in picture quality compare to the case where an image already stored in the memory is employed to have the watch area cut out and size-converted in order to generate a sub image.

The imaging device imaging device may obtain images so that an obtainment cycle of the imaging device is faster than a video frame cycle, and the main image storage unit and the image storage unit may read the images obtained by the imaging device at different times. This structure allows the main image and the sub image to be individually read.

The number of pixels which the imaging device has may be greater than the numbers of pixels in the main image or the sub image. The main image storage unit may convert the number of pixels included in the image of the main image area, and store the image of the main image area, which has the converted number of pixels, in the memory as the main image. The sub image storage unit may convert the number of pixels included in the image of the watch area, and store the image of the watch area, which has the converted number of pixels, in the memory as the sub image. This structure makes possible preventing picture quality of the image area from deteriorating.

The sub image storage unit may store in the memory images of watch areas including the image of the watch area as sub images including the sub image, the sub images corresponding to the respective watch areas. The main image storage unit and the sub image storage unit may (i) determine respective reading frame cycles of the images of the main image area and the watch area according to the number of the sub images, and (ii) store the main image and the sub image in the memory at the determined respective reading frame cycles. The encoder may encode the main image and the sub image at the determined respective reading frame cycles. This structure makes the imaging apparatus extensible to handle two or more watch areas.

The imaging apparatus according the aspect of the present invention may further include an area specifying unit which dynamically specifies the watch area. The structure makes possible recording any given sub image by causing the area specifying unit to specify the watch area. Thus in the case where the watch area is an area of a moving object, for example, the sub image is an image following the moving object. The area specifying unit may (i) include an input device having a touch panel, and (ii) specify an area designated by the input device as the watch area. This structure makes possible certainly specifying the watch area as the user desires. Accordingly, the usability which the user feels improves.

The area specifying unit may (i) include a human detecting unit which detects a desired person by person recognition to detect an area of the detected person, and (ii) specify the area detected by the human detecting unit as the watch area. When a person is captured, this structure allows a sub image to be automatically selected and obtained.

The area specifying unit may (i) include a motion estimating unit which estimates an area in which a motion is estimated by motion estimation, and (ii) specify the area estimated by the motion estimating unit as the watch area. This structure makes possible automatically selecting and capturing a watch area showing a motion, which is useful in a surveillance camera.

The area specifying unit may (i) include an eye-gaze detecting unit which detects an eye gaze of a user to specify an area at which the user is watching using the detected eye gaze, and (ii) select the area specified by the eye-gaze detecting unit as the watch area. This structure can alleviate a troublesome manual selection operation of the user, and specify any given watch area. The imaging apparatus according the aspect of the present invention may further include a sub image information generating unit which records information indicating the watch area as additional information in the recording medium, the watch area being specified by the area specifying unit. This structure allows watch area information selected by the area specifying unit to be included in storage data as additional information which in not an image, the area specifying unit which is included in the sub image information generating unit.$_{<0)}$ As a result, the watch area can be easily found when data in the recording medium is reproduced.

The imaging apparatus according to the aspect in the present invention may include a displaying unit which displays the image of the main image area and the image of the watch area. This structure allows the images to be displayed on a physically single displaying apparatus, which makes possible simplifying a structure of the imaging apparatus. In addition, the structure contributes to a higher level of visibility since the user can check a main image and a sub image on a single displaying apparatus.

The displaying unit may change to display a frame color of a displayed image, of a watch area, corresponding to the sub image depending on whether or not the recording unit is recording the sub image. This structure makes possible showing the user a current recording status in the case where the user separately controls recording and pausing recording of a sub image. The imaging apparatus according to the aspect in the present invention may further include a main image displaying unit which displays the image of the main image area; and a sub image displaying unit which displays the image of the watch area. This structure allows an imaging apparatus equipped with a finder and a display panel to display (i) an image of a main image area on the finder, and (ii) an image of a watch area on the display panel. As a result, the user can capture an object, checking both of the images. This improves user-friendliness of the imaging apparatus.

The present invention achieves an effect of obtaining images of different areas at once out of an input image provided by a single camera.

FURTHER INFORMATION ABOUT TECHNICAL BACKGROUND TO THIS APPLICATION

The disclosure of Japanese Patent Application No. 2008-117725 filed on Apr. 28, 2008 including specification, drawings and claims is incorporated herein by reference in its entirety.

The disclosure of PCT application No. PCT/JP2009/001918 filed on Apr. 27, 2009, including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 10A exemplifies a display screen;

FIG. 10B exemplifies another display screen;

DESCRIPTION OF THE PREFERRED EMBODIMENTS

An imaging apparatus according to an implementation of the present invention is connected to a memory, and includes the following: an imaging device which reads any given area; a main image storage unit which reads an image of a main image area, the image representing a whole image formed on the imaging device, and store in the memory an image associated with the read image as a main image; a sub image storage unit which reads an image of a watch area from the imaging device, the watch area being an area to be watched, and store the read image in the memory as a sub image; an encoder which encodes the main image and the sub image stored in the memory by the main image storage unit and the sub image storage unit; and a recording unit which records the main image and the sub image encoded by the encoder on a recording medium.

Described hereinafter is an imaging apparatus according to Embodiments of the present invention, with reference to the drawings.

(Embodiment 1)

Figure 1:
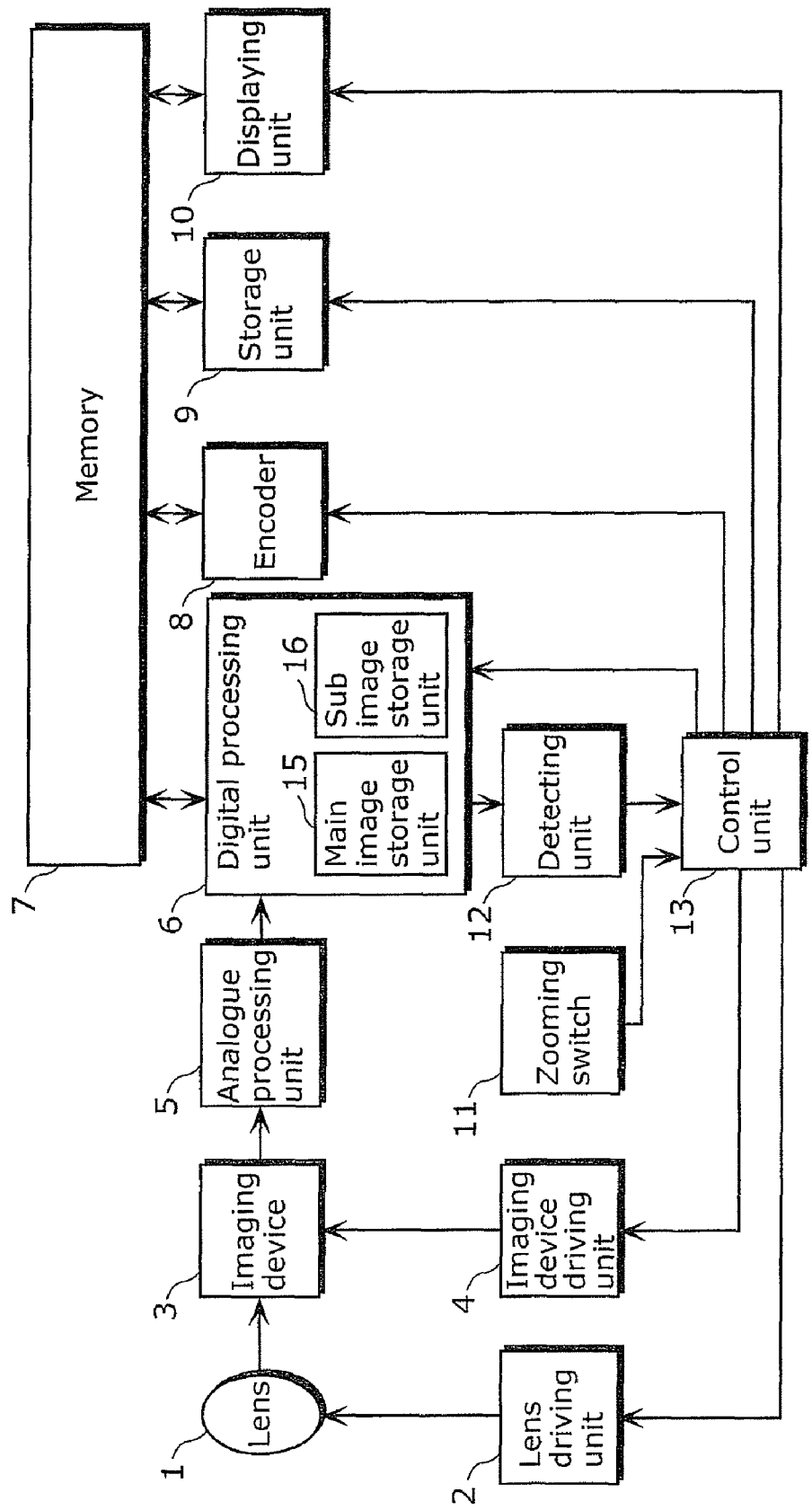
FIG. 1 is a block diagram showing a system structure of an imaging apparatus according to Embodiment 1 of the present invention.

FIG. 1 is a block diagram showing a system structure of an imaging apparatus according to Embodiment 1. The imaging apparatus includes the following: a lens 1 which is an optical element and capable of zooming; a lens driving unit 2 which drives the lens 1 and causes the lens 1 to perform zooming; a zooming switch 11 which designates a zooming direction and a zooming amount of the lens 1; an imaging device 3 which photoelectrically-converts light of an object passing through the lens 1 to provide an image signal; an imaging device driving unit 4 which generates a driving signal to be used for taking any given area from the imaging device 3 as an image; an analogue processing unit 5 which performs various kinds of processing, such as noise reduction, gain control, and analogue-digital conversion, on the analogue image signal provided from the imaging device 3; a digital processing unit 6 which performs Y/C conversion and electronic zooming on the digitalized image signal; a memory 7 which temporarily stores the image processed by the digital processing unit 6; an encoder 8 which encodes the image stored in the memory 7 according to a predetermined format; a recording unit 9 which records the image data encoded by the encoder 8 in a recording medium, such as a secure digital (SD) card, and a hard disk drive (HDD); a displaying unit 10, such as a liquid crystal display (LCD) and an organic electro luminescence (EL) display, which displays the image provided from the digital processing unit 6 so that the user can check the image; a detecting unit 12 which detects an image area to be watched included in the image data processed by the digital processing unit 6; and a control unit 13 which controls the entire imaging apparatus. It is noted that the imaging apparatus includes the memory 7 in Embodiment 1; concurrently, an aspect of the present invention may be an imaging apparatus connected to an external memory for use instead of an imaging apparatus equipped with a memory. The detecting unit 12 works as an area specifying unit which specifies a watch area.

Specifically, the digital processing unit 6 includes a main image storage unit 15 and a sub image storage unit 16. The main image storage unit 15 reads an image signal corresponding to an image of a main image area from the analogue processing unit 5, the image which represents a whole image formed on the imaging device 3, and stores in the memory 7 an image associated with the read image signal as a main image. The sub image storage unit 16 reads an image signal corresponding to an image of a watch area from imaging device 3, and stores the read image signal in the memory 7 as a sub image. Here, the watch area is an area to be watched.

Described next in detail is each of the constituent features.

Figure 2:
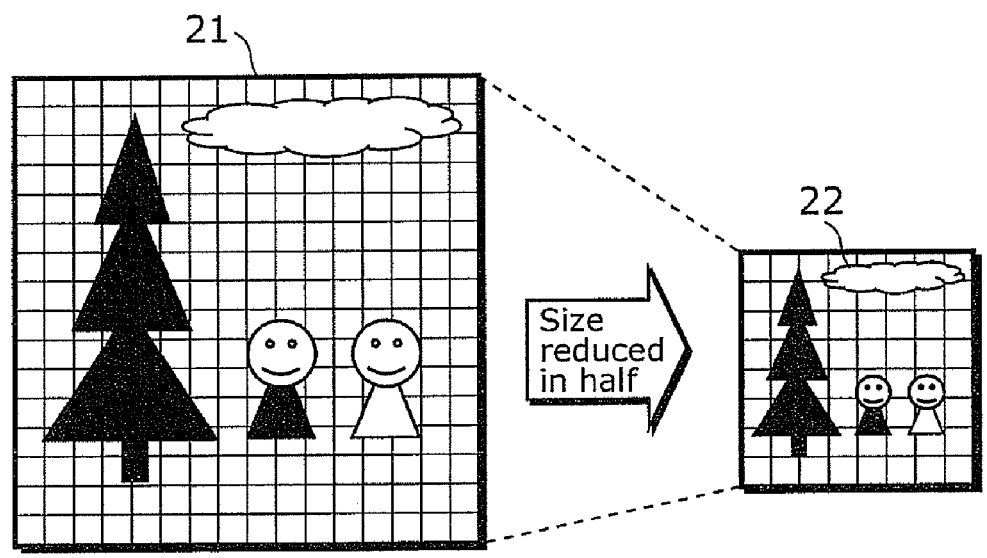
FIG. 2 is a schematic view showing reading of a main image.
Figure 3:
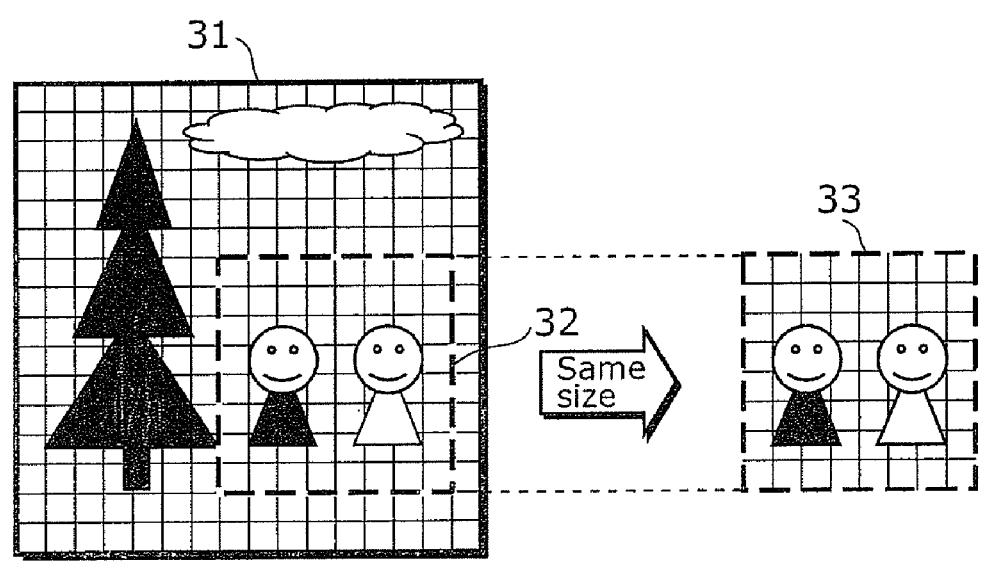
FIG. 3 is a schematic view showing reading of a sub image.

FIGS. 2 and 3 show operations on how the digital processing unit 6 reads an image from the imaging device 3. To simplify the description, the imaging device 3 has 256 pixels (16×16 pixels) and a moving picture stored in the memory 7 has 64 pixels (8×8 pixels).

As shown in FIG. 2, the main image storage unit 15 included in the digital processing unit 6 stores a whole image 21 (an image of the main image area) in the memory 7 as a main image 22, the whole image 21 which is formed on the imaging device 3. Here, the main image storage unit 15 reduces a horizontal and vertical size of the whole image 21 of the main image area in half to generate the main image 22. In horizontal and vertical directions, specifically, the main image 22 has one half as many pixels as those in the whole image 21 which is the main image area.

As shown in FIG. 3, the sub image storage unit 16 included in the digital processing unit 6 stores an image (a watch area image 32) in the memory 7 as a sub image 33. The watch area image 32 is (i) included in a whole image 31 formed on the imaging device 3, and (ii) found in the image area to be watched and detected by the detecting unit 12. Here, the sub image storage unit 16 generates the sub image 33 with the same size as the size of the watch area image 32 instead of changing the horizontal and vertical size. As described above, the number of pixels which the imaging device 3 has is greater than that of the images recorded in the memory 7 as the main image and the sub image.

When generating the main image 22, the main image storage unit 15 may convert the number of the pixels either by: thinning the pixels read from the imaging device 3; or reading all the pixels from the imaging device 3, and provides digital filtering to the read pixels.

As an example, the watch area image 32 and the sub image 33 are the same in the number of pixels when the sub image storage unit 16 generates the sub image 33; concurrently, the number of pixels may be different. When the number of the pixels is different, the sub image storage unit 16 may convert the number of the pixels either by thinning the read pixels or performing digital filtering on the watch area image 32.

Described next is how the image formed on the imaging device 3 is recorded in the recording medium by the recording unit 9.

Figure 4:
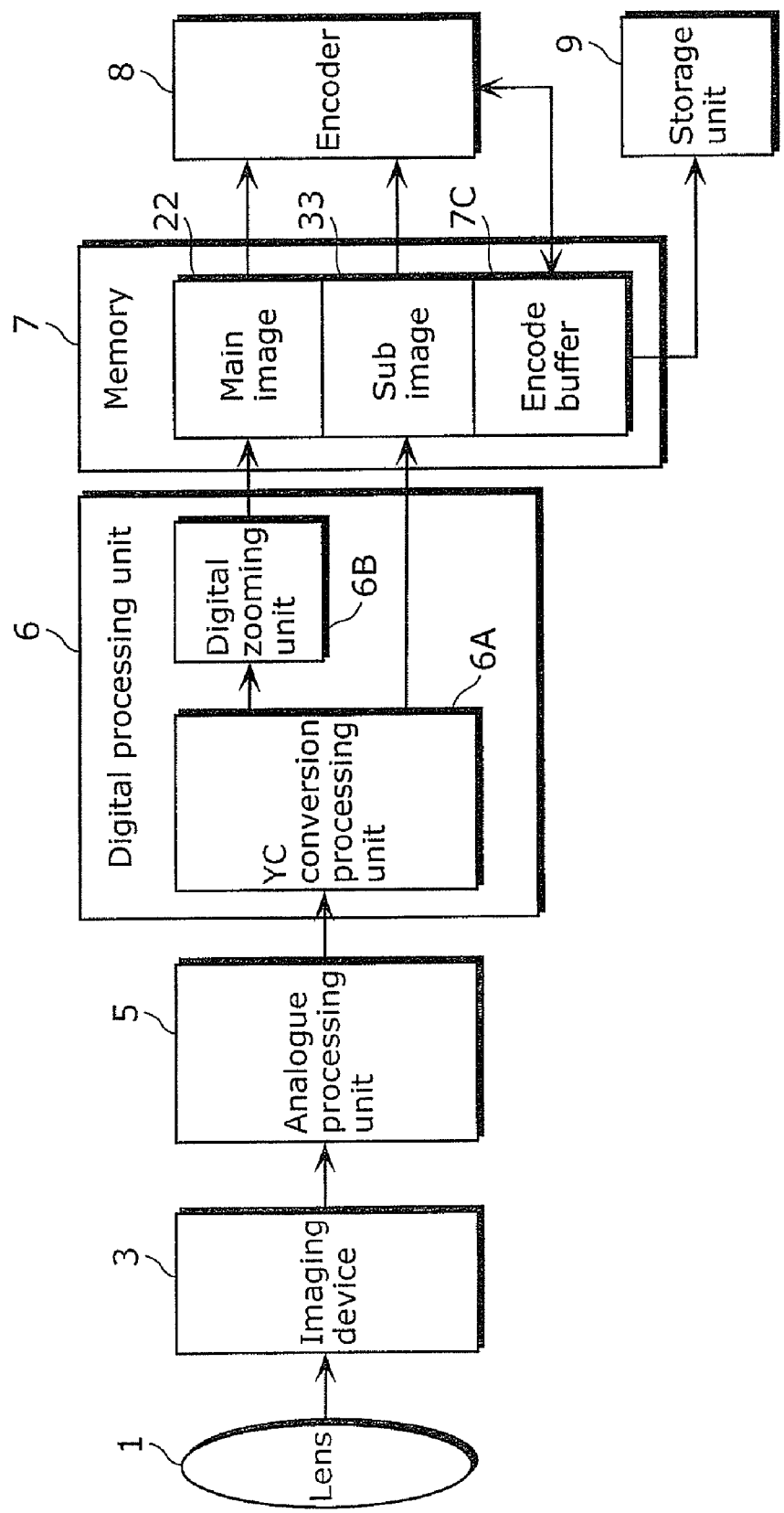
FIG. 4 shows a data flow on how an image is stored in a recording medium in view of a buffer configuration of a memory.

FIG. 4 shows a data flow on how the image formed on the imaging device 3 is recorded in the recording medium in view of a buffer configuration of the memory 7.

As shown in FIG. 4, the digital processing unit 6 includes a YC conversion processing unit 6A and a digital zooming unit 6B as hardware. The YC conversion processing unit 6A converts R, G, and B image signals provided from the analogue processing unit 5 into Y (luminance) and C (color difference) signals. The digital zooming unit 613 enlarges and reduces the image converted by the YC conversion processing unit 6A.

FIGS. 2 and 3 exemplify that the whole image 21 is reduced to a half in size and stored in the memory 7 as the main image 22 by the digital zooming unit 6B. On the other hand, the image of a watch area 32 is not enlarged or reduced by the digital zooming unit 6B. Instead, the watch area image 32 is cut out with the size remained and stored in the memory 7 as the sub image 33. In other words, the main image storage unit 15 includes the YC conversion processing unit 6A and the digital zooming unit 6B as hardware, and the sub image storage unit 16 includes the YC conversion processing unit 6A as hardware. It is noted that the sub image storage unit 16 may include the digital zooming unit 6B as hardware to enlarge and reduce the watch area image 32 so as to generate a sub image.

Next, the encoder 8 receives the main image 22 and the sub image 33 stored in the memory 7 as input images, and encodes the input images. Here, a reference image required for encoding and an encoded moving picture are stored in an encode buffer 7C. The recording unit 9 obtains the encoded moving picture from the encode buffer 7C, and writes the obtained moving picture in a recording medium.

In the imaging apparatus according to Embodiment 1, the imaging device 3 has a pixel with higher definition than that of a moving picture. Thus, the sub image requires no digital zooming processing, and the main image is reduced out of an image with high definition. Accordingly, the imaging apparatus can curb deterioration in picture quality. In order to store an image converted into a desired size in the memory 7, the imaging apparatus can reduce the number of memory accesses and capacity of a memory in use.

Figure 5:
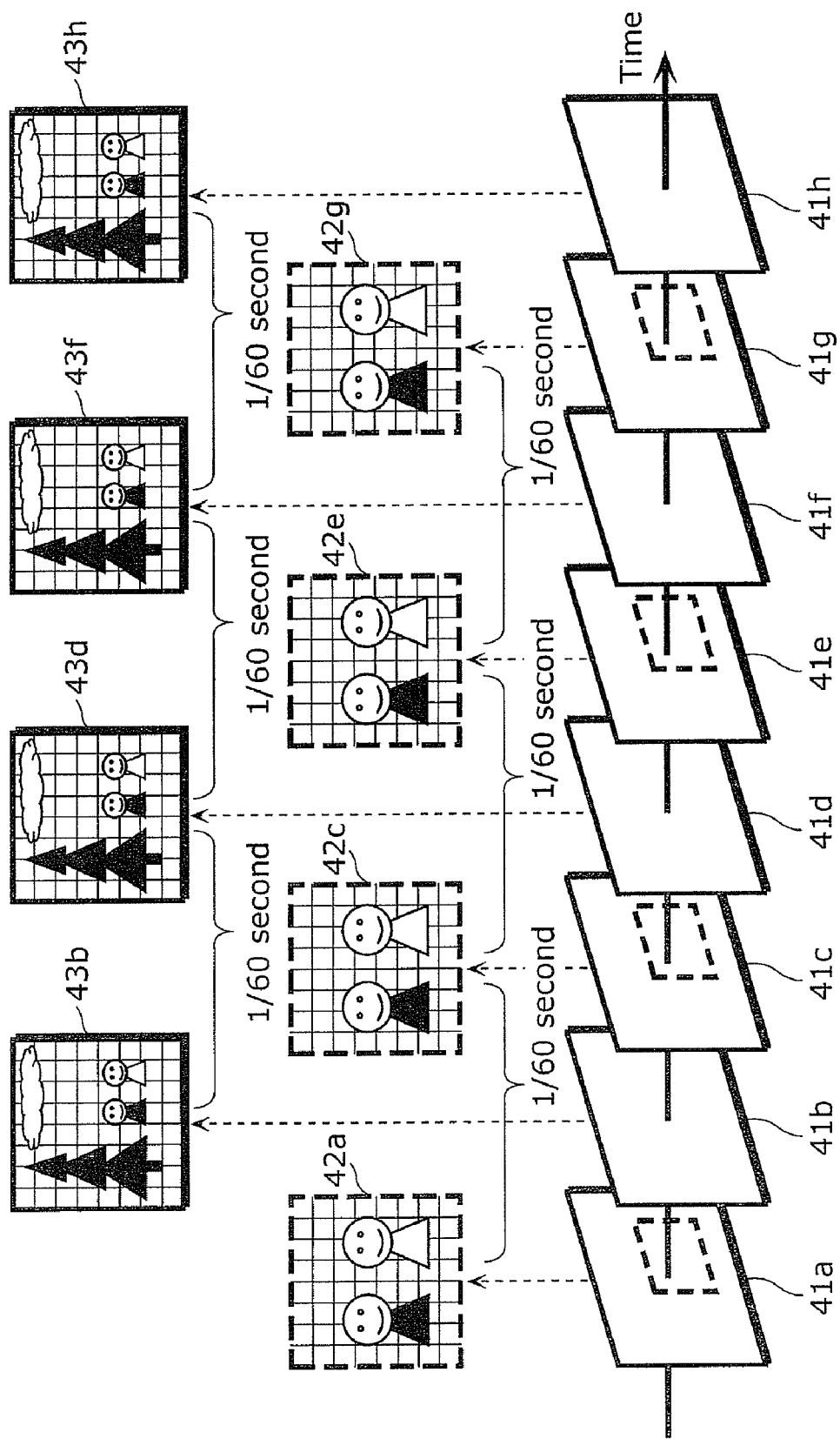
FIG. 5 shows in time sequence an image scanning operation of a digital processing unit.

FIG. 5 shows in time sequence an image scanning operation of the digital processing unit 6. The imaging device 3 is capable of obtaining images so that an obtainment cycle of the imaging device 3 is faster than a video frame cycle. For example, the imaging device 3 is capable of imaging as fast as 120 frames a second. Here, whole images 41a to 41h represent images obtained by the imaging device 3 at a $\frac{1}{120}$ second cycle. The digital processing unit 6 switches between a main image and a sub image for each frame cycle of the imaging device 3, and stores the images in the memory 7.

In other words, the main image storage unit 15 converts the number of pixels of the whole images 41b, 41d, 41f, and 41h that are images of a main image area, and stores in the memory 7 the images as main images 43b, 43d, 43f and 43h. The sub image storage unit 16 stores in the memory 7 images of watch areas included in the whole images 41a, 41c, 41e, and 41g as sub images 42a, 42c, 42e, and 42g.

Thus, both the main images 43b, 43d, 43f, and 43h, and the sub images 42a, 42c, 42e, and 42g are obtained at a $\frac{1}{60}$ second cycle. In other words, the digital processing unit 6 generates images in two different kinds out of images in one kind, and stores the images in the memory 7.

It is noted that two or more watch areas may be obtained. In this case, the sub image storage unit 16 stores in the memory 7 images of such watch areas as sub images corresponding to the respective watch areas.

Figure 6:
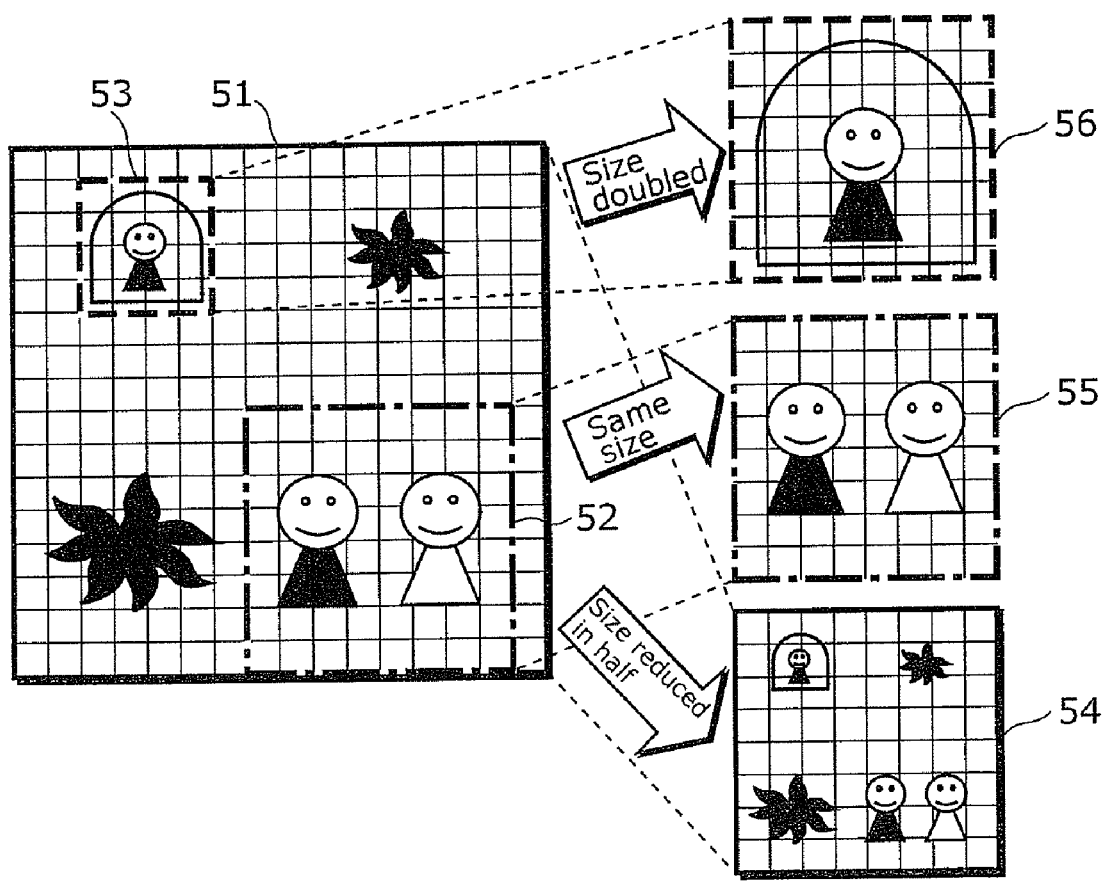
FIG. 6 is a schematic view showing reading of several sub images.

FIG. 6 shows in time sequence an operation of the digital processing unit 6 reading two watch areas. The main image storage unit 15 included in the digital processing unit 6 stores a whole image 51 in the memory 7 as a main image 54, the whole image 51 which is formed on the imaging device 3. Here, the main image storage unit 15 reduces a horizontal and vertical size of the overall image 51 in half to generate the main image 54. The sub image storage unit 16 included in the digital processing unit 6 stores a watch area image 52 in the memory 7 as a sub image 55, the watch area image 52 which is detected by the detecting unit 12. Here, the sub image storage unit 16 generates the sub image 55 with the same size as that of the watch area image 52 instead of changing the horizontal and vertical size. The sub image storage unit 16 stores a watch area image 53 in the memory 7 as a sub image 56, the watch area image 53 which is additionally detected by the detecting unit 12. Here, the main image storage unit 16 doubles a horizontal and vertical size of the watch area image 53 to generate the sub image 56.

When generating the main image 54 as described above, the main image storage unit 15 may convert the number of the pixels either by: thinning the pixels read from the imaging device 3; or reading all the pixels from the imaging device 3, and provides digital filtering to the read pixels. The watch area images 52 and 53 may differ from a moving picture in the number of pixels. When the number of the pixels is different, the sub image storage unit 16 may convert the number of the pixels either by thinning the read pixels or performing digital filtering. Described here are two watch areas; concurrently, watch areas shall not be limited to two.

Figure 7:
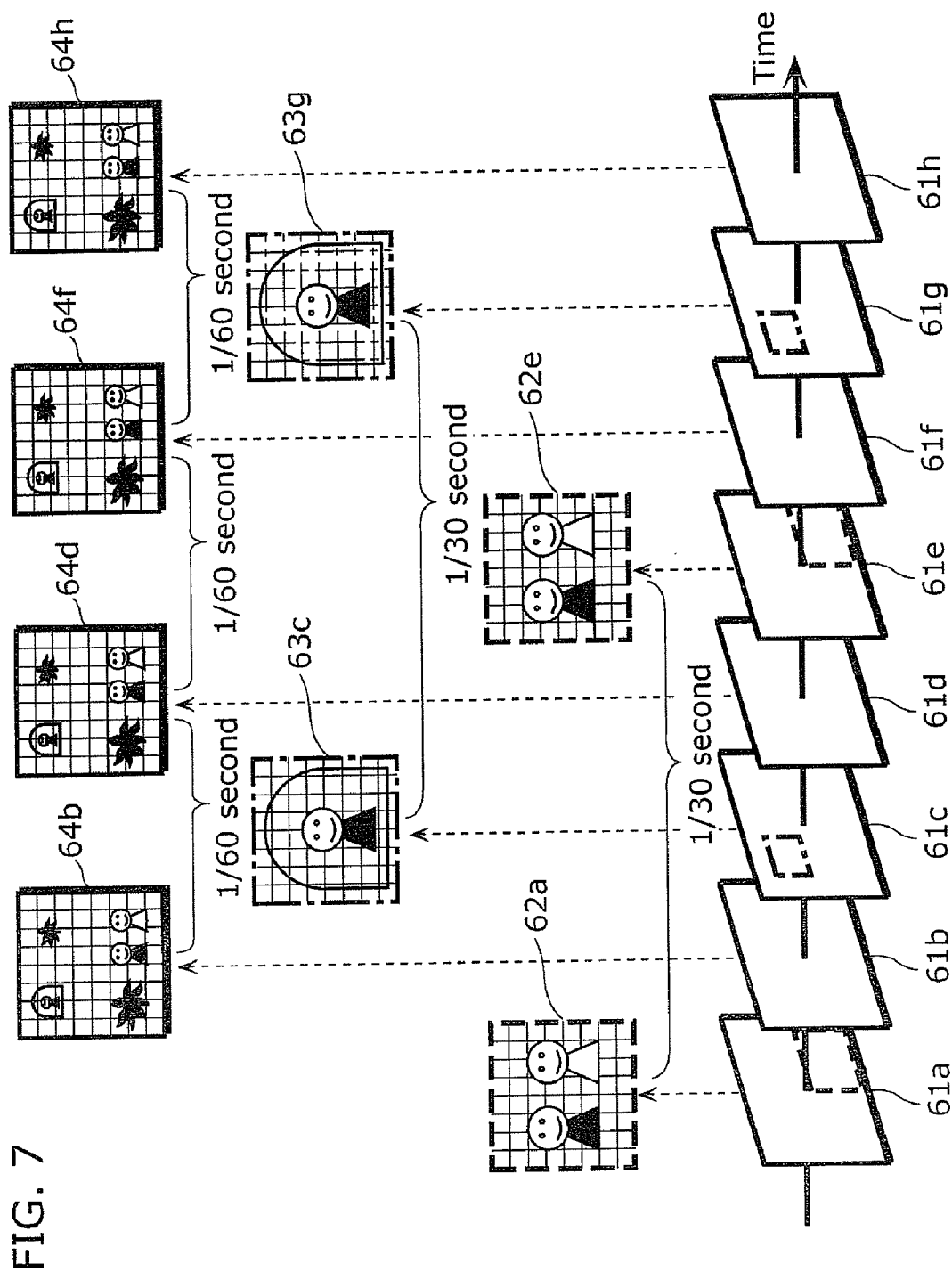
FIG. 7 shows in time sequence an image scanning operation of the digital processing unit when several sub images are found.

FIG. 7 shows in time sequence an image scanning operation of the digital processing unit 6 when two of the watch areas are found. The imaging device 3 is capable of imaging as fast as 120 frames a second. Here, whole images 61a to 61h represent images obtained by the imaging device 3 at a $\frac{1}{120}$ second cycle. The digital processing unit 6 stores the following: a main image for each frame cycle of the imaging device 3; and two kinds of sub images taken from frames other than main images. Here, the two kinds of the sub images are stored alternatively.

In other words, the main image storage unit 15 (i) converts the number of pixels of the whole images 61b, 61d, 61f, and 61h that are images of a main image area, and (ii) stores in the memory 7 the whole images 61b, 61d, 61f, and 61h with the number of pixels converted as main images 64b, 64d, 64f and 64h, respectively. The sub image storage unit 16 stores in the memory 7 images of a first watch area as first sub images 62a and 62b. Here, the images are included in whole images 61a and 61e. Moreover, the sub image storage unit 16 stores in the memory 7 images of a second watch area as second sub images 63c and 63g. Here, the images are included in whole images 61c and 61g.

Thus, the main images 64b, 64d, 64f, and 64h are obtained at a $\frac{1}{60}$ second cycle, and both of (i) the first sub images 62a and 62e, and (ii) the second sub images 63c and 63g are obtained at a $\frac{1}{30}$ second cycle. In other words, the digital processing unit 6 generates images in three different kinds out of images in one kind, and stores the images in the memory 7.

It is noted that the watch areas shall not be limited to two as described above. The storing cycle of each image shall not be limited, either.

Figure 8:
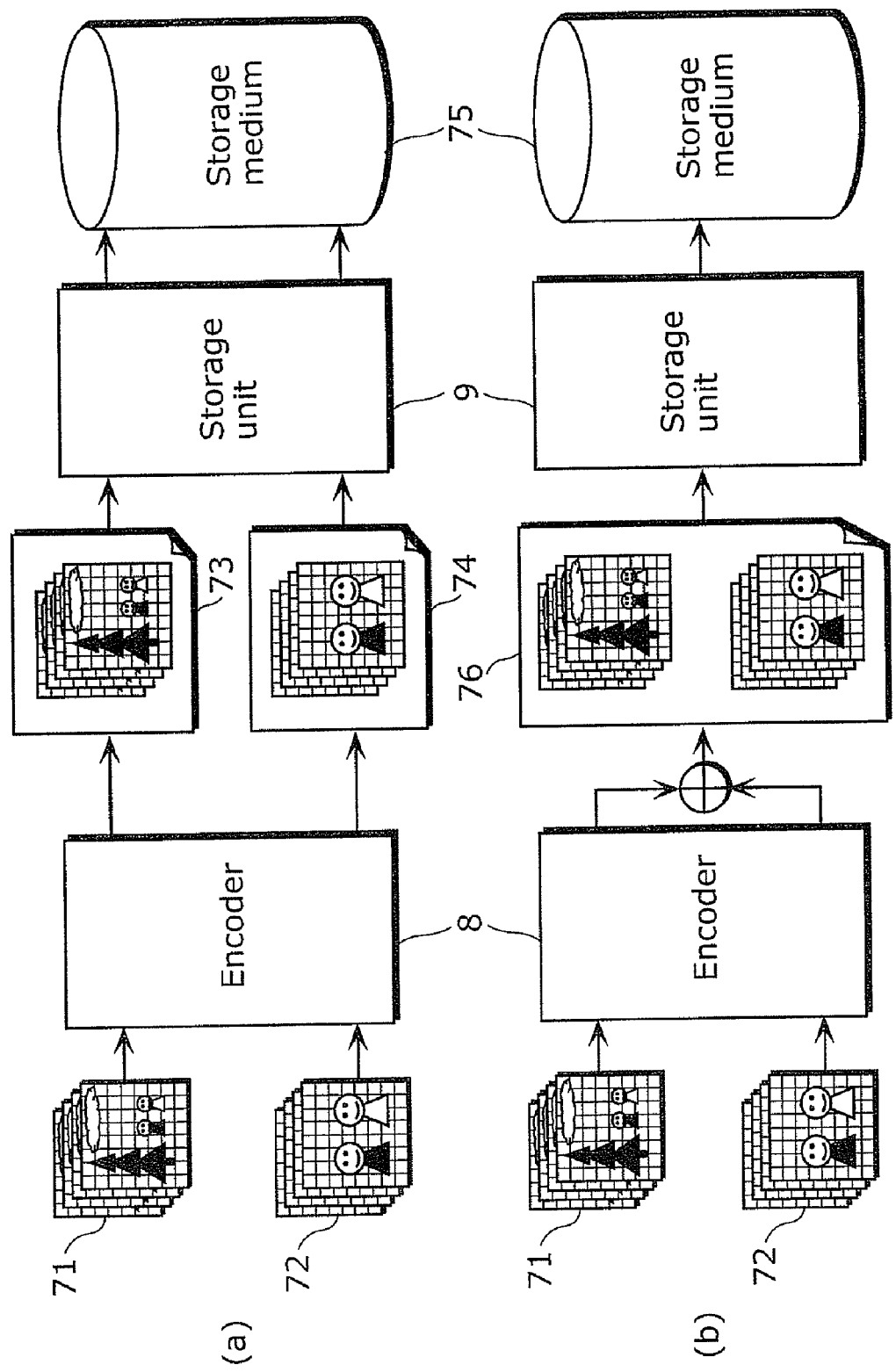
FIG. 8 is a schematic view showing an encoding operation performed on a main image and a sub image.

FIG. 8 shows an operation on how a main image and a sub image stored in the memory 7 are encoded and recorded.

The encoder 8 encodes (i) a main image 71 to generate a main image moving picture 73, and (ii) a sub image 72 to generate a sub image moving picture 74. The recording units 9 records the generated two different moving pictures in the recording medium 75 as two separate files. The encoder 8 also encodes the main image 71 and the sub image 72 to generate a multi-angle moving picture 76. The recording units 9 records the generated single multi-angle moving picture 76 in the recording medium 75 a single file.

It is noted that two different images are encoded here as an example; concurrently, the images shall not be limited to two. In the case of recording two or more moving pictures, a file name and an attribute of file management information may have characteristics so that the moving pictures are shown to be related.

In addition, when receiving a main image and a sub image, the imaging apparatus may determine respective reading frame cycles according to an imaging capability (a maximum frame cycle and the number of pixels) of the imaging device 3. The encoder 8 may employ each determined frame cycle to encode an image.

Figure 9:
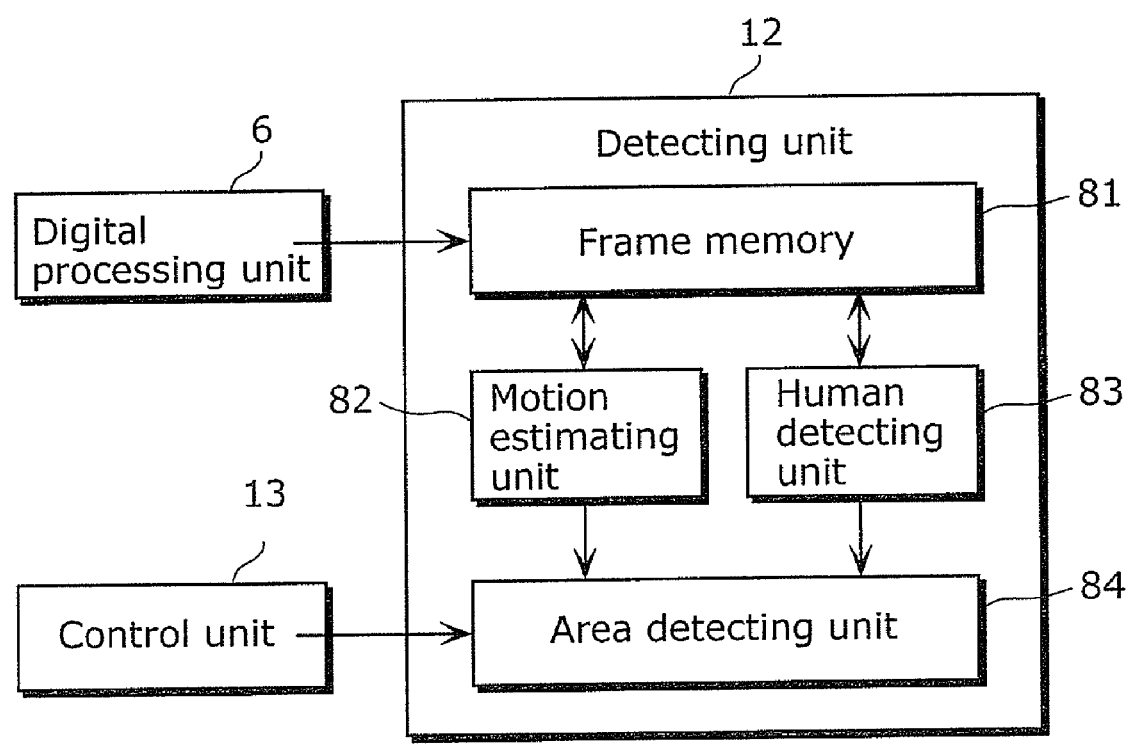
FIG. 9 is a block diagram showing a detailed structure of a detecting unit.

FIG. 9 is a block diagram showing a detailed structure of the detecting unit 12.

The detecting unit 12 includes a frame memory 81, a motion estimating unit 82, a human detecting unit 83, and an area detecting unit 84. Main image data obtained by the digital processing unit 6 is stored in the frame memory 81. Based on difference information between pieces of main image data each indicating a different time, the motion estimating unit 82 estimates an area showing a motion found in main images, and provides the estimated motion area information to the area detecting unit 84. Concurrently, the human detecting unit 83 stores patterns characteristic of a human face in advance, and detects whether or not an image is a human face by pattern matching. Then, the human detecting unit 83 provides to the area detecting unit 84 area information indicating an area where the detected person belongs. The area detecting unit 84 determines which area information should be enabled depending on which operation mode is currently activated: a motion estimating mode or human detecting mode. Then, the area detecting unit 84 provides area information to be watched to the control unit 13.

It is noted that the frame memory 81 is not necessarily physically located; instead, the frame memory 81 may be found on the memory 7. Furthermore, any given technique shall be used as the motion estimating technique of the motion estimating unit 82 and the human detecting technique of the human detecting unit 83. Another detecting technique may be used instead of a motion estimation or a human detection. Regarding a determination technique of the area detecting unit 84, the area detecting unit 84 may use both kinds of the area information, instead of choosing either kind of the area information, to integrate or delete the areas.

FIGS. 10A and 10B exemplify display screens provided on the displaying unit 10. A first watch area 91a is estimated by the motion estimating unit 82. A second watch area 92a is detected by the human detecting unit 83. FIG. 10A shows that area frames of the first watch area 91a and the second watch area 92a are superimposed on a main image 93a. FIG. 10B shows that the main image 93b, the first watch area 91b, and the second watch area 92b are split to be displayed on a single screen.

It is noted that those displaying techniques may be switched according to a configuration. In the case of a split screen, two or more display screens may be used to have each screen provide a respective display screen; namely, the main image 93b, the first watch area 91b, and the second watch area 92b.

The displaying unit 10 may change to display a frame color of a displayed image, of a watch area, corresponding to the sub image depending on whether or not the recording unit 9 is recording the sub image in the recording medium 75.

FIGS. 11A to 11D shows another example of a display screen of the displaying unit 10 during recording.

Figure 11A:
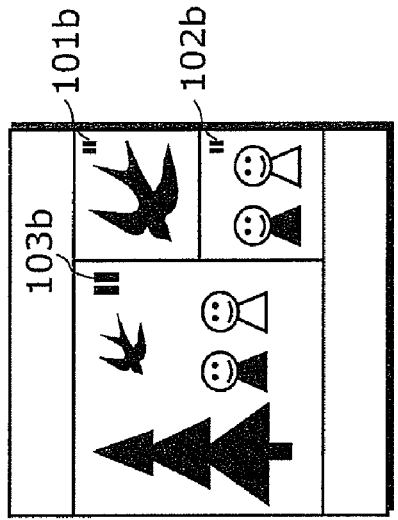
FIG. 11A exemplifies a display screen which shows a pause of recording in a full-screen display.

FIG. 11A exemplifies a display screen which shows a pause of recording in a full-screen display. Now, the display screen of the displaying unit 10 is showing (i) a motion estimating frame 101a showing the first watch area, and (ii) a human detecting frame 102a showing the second watch area.

Here, paused is recording of the images of the first and the second watch areas. Hence, the motion estimating frame 101a and the human detecting frame 102a are displayed in green, for example. Since recording of the main image is in pause, a recording pause mark 103a is displayed.

Figure 11B:
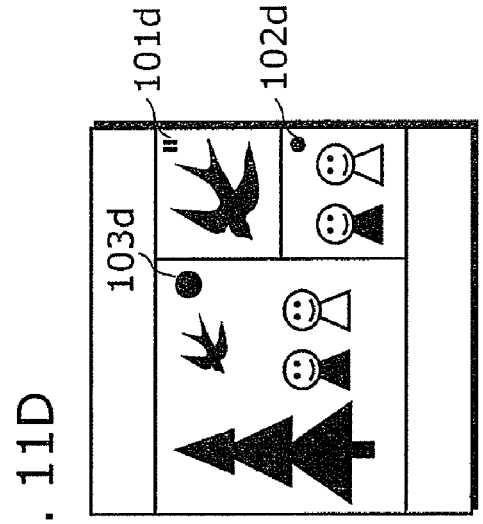
FIG. 11B exemplifies a display screen which shows a pause of recording in a split-screen display.

FIG. 11B exemplifies a display screen which shows a pause of recording in a split-screen display. Here, each screen has recording pause marks 101b, 102b, and 103b displayed.

Figure 11C:
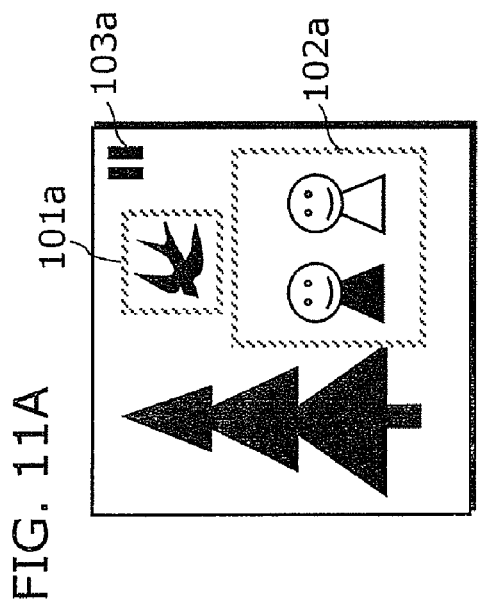
FIG. 11C exemplifies a display screen which shows recording in a full-screen display in a human detecting mode.

FIG. 11C exemplifies a display screen which shows recording in a full-screen display in the human detecting mode. The human detecting mode employs, as a recording target, the image of the second watch area detected by the human detecting unit 83. Thus, a human detecting frame 102c is displayed in red, for example. The image of the first watch area detected by the motion estimating unit 82 is not a recording target. Thus a motion estimating frame 101c is displayed in green, for example. Since the main image is being recorded, a recording mark 103c is displayed.

Figure 11D:
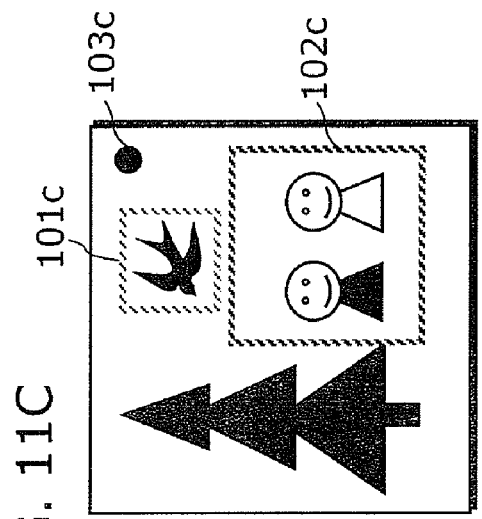
FIG. 11D exemplifies a display screen which shows recording in a split-screen display in the human detecting mode.

FIG. 11D exemplifies a display screen which shows recording in a split-screen display in the human detecting mode. The first watch area estimated by the motion estimating unit 82 is not a recording target. Thus, a recording pause mark 101d is displayed. The second watch area detected by the human detecting unit 83 is a recording target. Thus, a recording mark 102d is displayed. Since the main image is being recorded, a recording mark 103d is displayed.

The above structure makes possible showing the user a current recording state in the case where the user separately controls recording and pausing recording of a sub image.

It is noted that frames are displayed for an estimation area and a detecting area which are not recording targets. However, the frames are not necessarily displayed when the areas are not subject to display. In the case where a split-display is employed, the areas are not necessarily displayed on the screen.

As described above, the imaging apparatus according to Embodiment 1 can record a main image and a sub image at once in the case where a main image area and a watch area are different. In addition, the imaging apparatus generates the sub image out of an image of a watch area before storing an image corresponding to the image of the watch area in the memory 7. This operation allows the imaging apparatus to reduce deterioration in picture quality compare to the case where an image corresponding to the image of the watch area stored in the memory 7 is employed to have an image of the watch area cut out and size-converted in order to generate a sub image.

The imaging apparatus according to Embodiment 1 can determine a watch area using human detection and motion estimation instead of a user of the imaging apparatus manually determining the watch area.

(Embodiment 2)

An imaging apparatus according to Embodiment 2 determines a watch area via an operation of a user. In Embodiment 2, constituent features identical to those in Embodiment 1 share the same numerical references. Thus, detailed description thereof shall be omitted.

Figure 12:
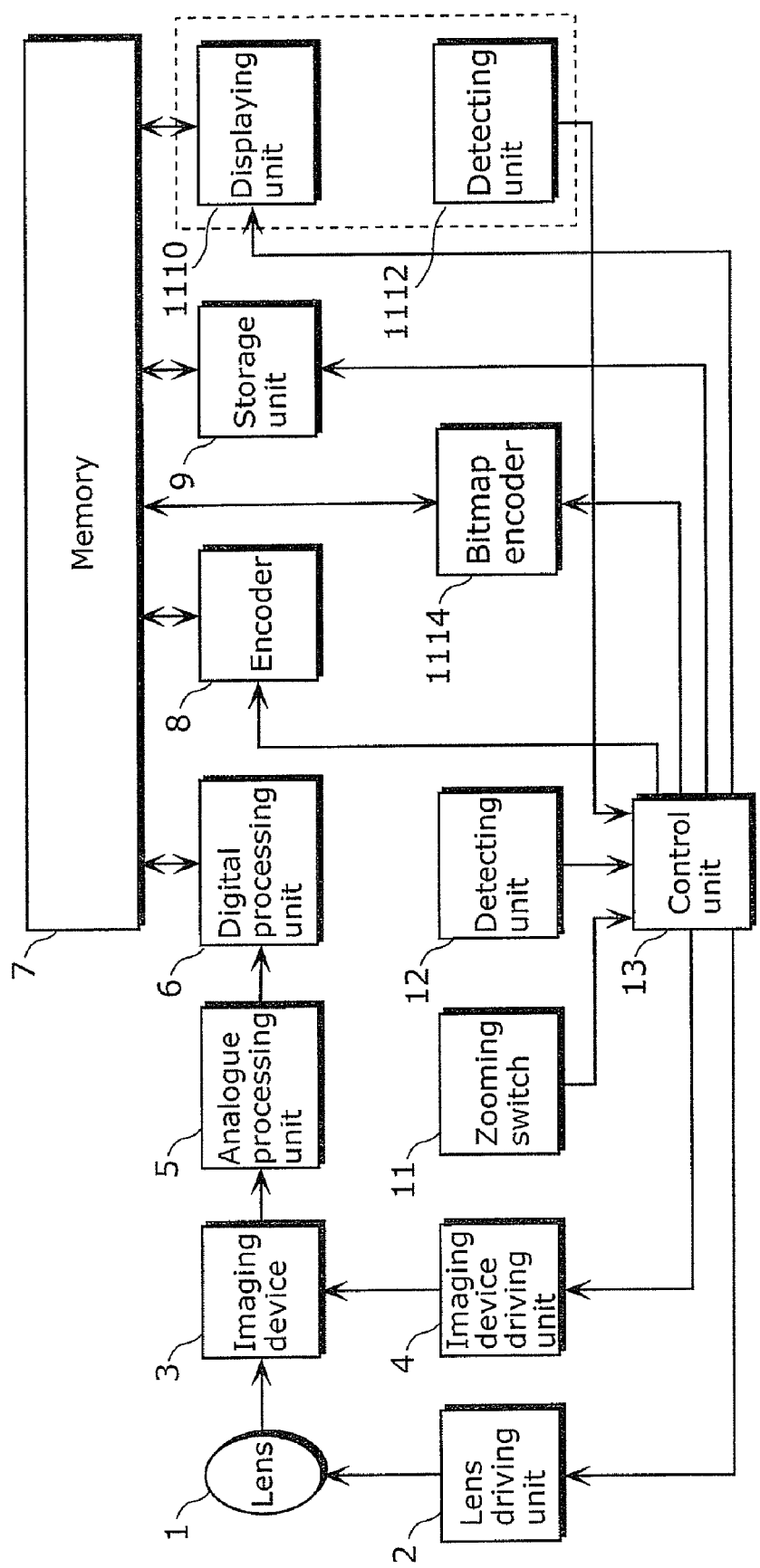
FIG. 12 is a block diagram showing a system structure of an imaging apparatus according to Embodiment 2 of the present invention.

FIG. 12 is a block diagram showing a system structure of the imaging apparatus according to Embodiment 2. The imaging apparatus includes the following: the lens 1 which is an optical element and capable of zooming; the lens driving unit 2 which drives the lens 1 and causes the lens 1 to perform zooming; the zooming switch 11 which designates a zooming direction and a zooming amount of the lens 1; the imaging device 3 which photoelectrically-converts light of an object passing through the lens 1 to provide an image signal; the imaging device driving unit 4 which generates a driving signal to be used for taking any given area from the imaging device 3 as an image; the analogue processing unit 5 which performs various kinds of processing, such as noise reduction, gain control, and analogue-digital conversion, on the analogue image signal provided from the imaging device 3; the digital processing unit 6 which performs Y/C conversion and electronic zooming on the digitalized image signal; the memory 7 which temporarily stores the image processed by the digital processing unit 6; the encoder 8 which encodes the image stored in the memory 7 according to a predetermined format; the recording unit 9 which stores the image data encoded by the encoder 8 in a recording medium, such as an SD card, and an HDD; a displaying unit 1110, such as an electronic view finder (EVF), which displays the image provided from the digital processing unit 6 so that the user can check the image; a detecting unit 1112 which detects an image area to be watched through cooperation with the displaying unit 1110; a bitmap encoder 1114 which encodes bitmap data of an on-screen displaying frame used for showing the image area detected by the detecting unit 1112; and the control unit 13 which controls all the constituent features.

The comparison shows that the imaging apparatus according to Embodiment 2 is approximately the same as the imaging apparatus according to Embodiment 1 in system structure. The imaging apparatus according to Embodiment 2 differs from the imaging apparatus according to Embodiment 1 in the following: the bitmap encoder 1114 is included; and the detecting unit 1112 detects an operation of the user. It is noted that the bitmap encoder 1114 works as a sub image information generating unit which records in a recording medium information indicating a watch area as additional information.

It is noted that the imaging apparatus includes the memory 7 in Embodiment 2; concurrently, the memory 7 may be placed out of the imaging apparatus, as described in Embodiment 1.

Detailed next are the differences between Embodiments 1 and 2.

First, the detecting unit 1112 is described. The detecting unit 1112 works through cooperation with the displaying unit 1110.

Figure 13A:
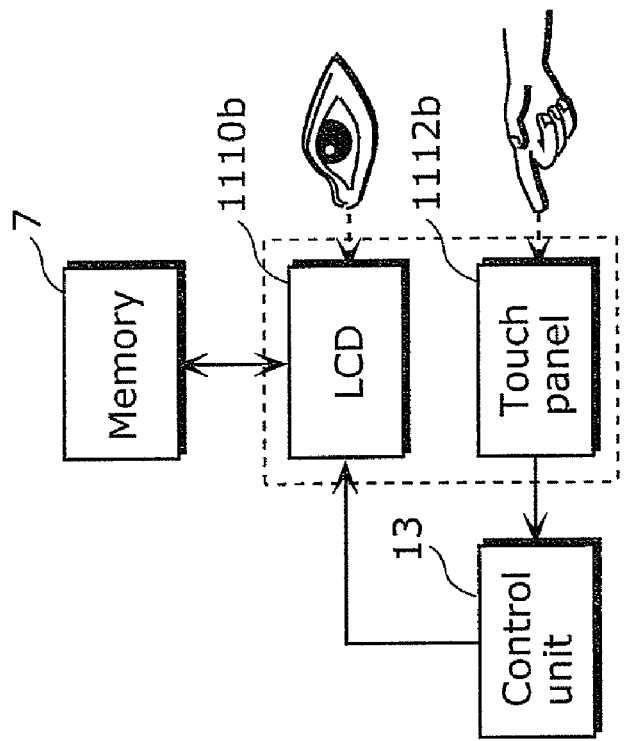
FIG. 13A is a block diagram showing an example of a displaying unit and a detecting unit.
Figure 13B:
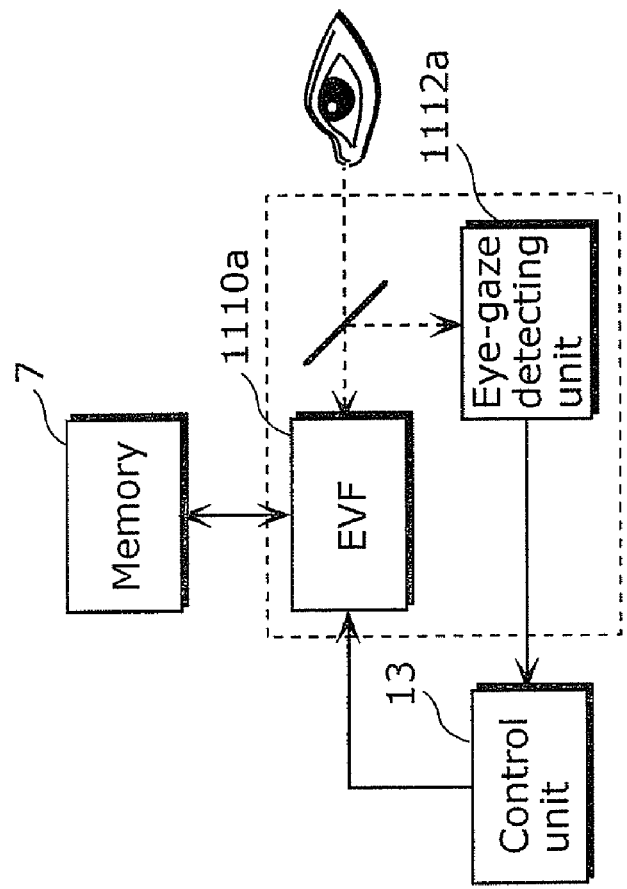
FIG. 13B is a block diagram showing another example of a displaying unit and a detecting unit.

FIGS. 13A and 13B are block diagrams showing an example of the displaying unit 1110 and the detecting unit 1112. FIG. 13A shows an EVF 1110*a* and an eye-gaze detecting unit 1112*a* as examples of the displaying unit 1110 and the detecting unit 1112, respectively. FIG. 13B shows an LCD 1110*b* and a touch panel 1112*b* as other examples of the displaying unit 1110 and the detecting unit 1112. When the user looks at the EVF 1110*a*, the eye-gaze detecting unit 1112*a* detects an area which the user is watching, and notifies the control unit 13 of information on the watch area, as shown in FIG. 13A. This operation alleviates a trouble which comes with a manual operation of the user.

In another structure, as shown in FIG. 13B, the user checks a main image displayed on the an LCD 1110*b*, and designates a part which the user desires to capture as a sub image via the touch panel 1112*b*. Information on the designated watch area is provided to the control unit 13, and, as seen in Embodiment 1, an image of the selected area is recorded as the sub image. This operation makes possible certainly specifying a watch area as the user desires. Accordingly, the usability of the imaging apparatus improves.

It is noted that another operation may be carried out instead of the designation with an eye-gaze or via a touch panel.

As described above, a sub image selecting technique may involve selecting, as a watch area, any of the following for specifying the watch area and recording any given sub image: a part designated via a touch-panel input device; a desired person extracted using person recognition; a part in which a motion is estimated using motion estimation; and a part which the user is watching using eye-gaze detection.

Next, the bitmap encoder 1114 is described.

Figure 14:
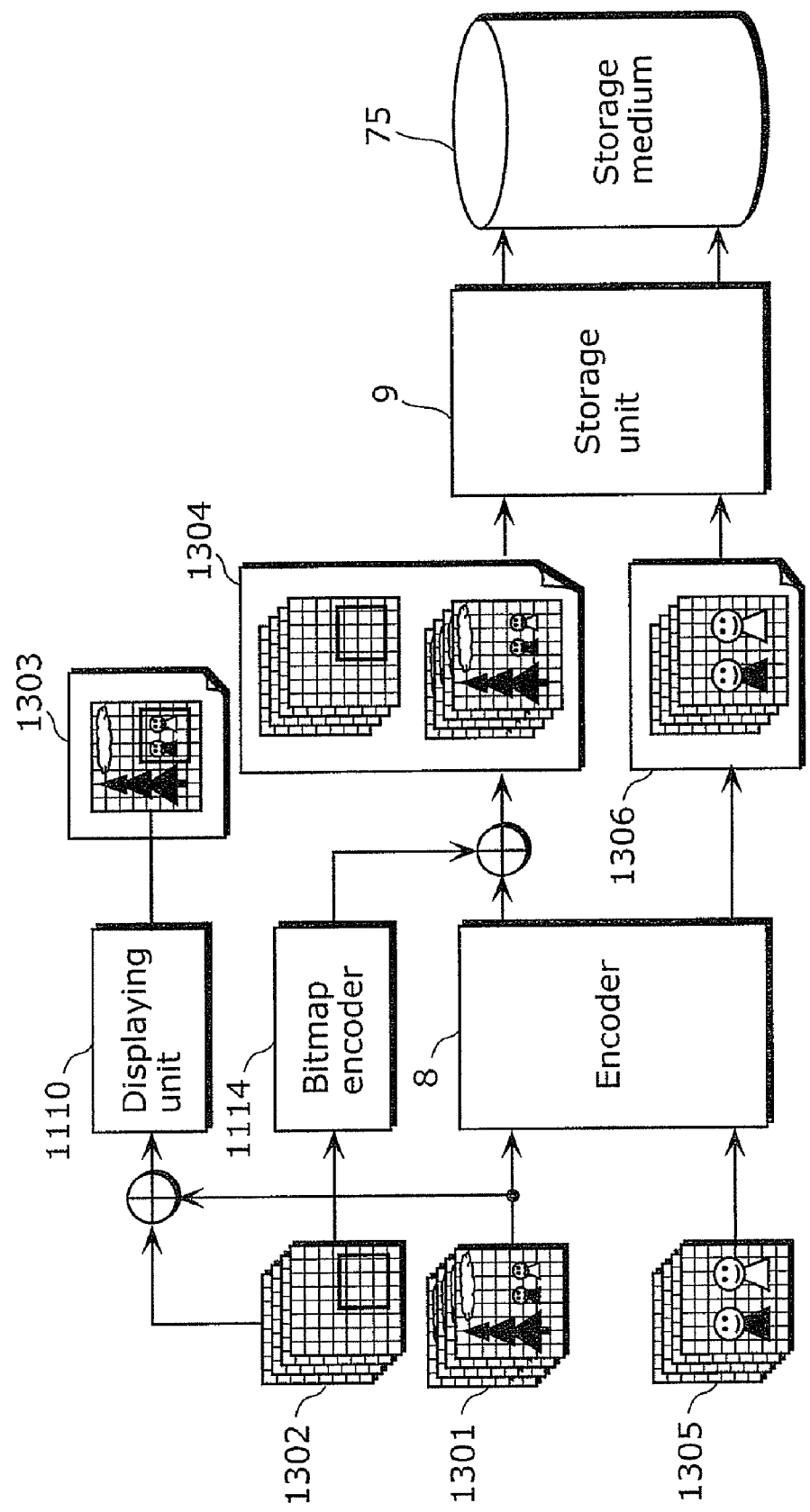
FIG. 14 is a schematic view showing how a bitmap encoder records a frame of a watch area as additional information.

FIG. 14 is a schematic view showing how the bitmap encoder 1114 records, as additional information, a frame of a watch area detected by detecting unit 1112. The memory 7 stores a main image 1301, a watch area frame 1302 included in the main image, and a sub image 1305. The main image 1301 is Y/C image data. The watch area frame 1302 is bitmap data generated using a Y/C color pallet. The sub image 1305 is Y/C image data. The displaying unit 1110 displays a display screen 1303 into which the main image 1301 and the watch area frame 1302 are synthesized. The bitmap encoder 1114 Run-Length encodes the watch area frame 1302.

The encoder 8 encodes the main image 1301, and multiplexes the encoded main image and the Run-Length encoded bitmap data. Then, the encoder 8 generates a single main image moving picture 1304. The encoder 8 encodes the sub image 1305 to generate a single sub image moving picture 1306. The recording unit 9 stores the main image moving picture 1304 and the sub image moving picture 1306 in the recording medium 75.

This structure allows the user to see which image is recorded as a sub image when a main image moving picture is replayed.

It is noted that a bitmap data compression technique shall not be limited to the Run Length Encoding; instead, another compression technique may be employed. Instead of compressing the bitmap data itself, furthermore, information may be added as metadata which comes with a moving picture.

As described above, the imaging apparatus according to Embodiment 2 records the bitmap data in the recording medium 75 as additional information, the bitmap data which is Run-Length encoded by the bitmap encoder 1114. This makes possible easily specifying a watch area when data in the recording medium is reproduced.

In the imaging apparatus according to Embodiment 2, the control unit 13 receives an input from the zooming switch 11 to control the lens 1, cause a main image to be formed on the imaging device 3, and store in the memory 7 the main image and a watch area which is (i) included in the main image and (ii) detected by the detecting unit 12. The main image and the sub image are images obtained at times which differ from each other, and stored in the memory 7. The encoder 8 separately encodes the main image and the sub image, and the recording unit 9 records the main image and the sub image, which differ from one another, at once. Thus, the imaging apparatus has an excellent effect to obtain images of different areas at once out of an input image provided by a single camera.

Although only Embodiments 1 and 2 of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

Figure 15:
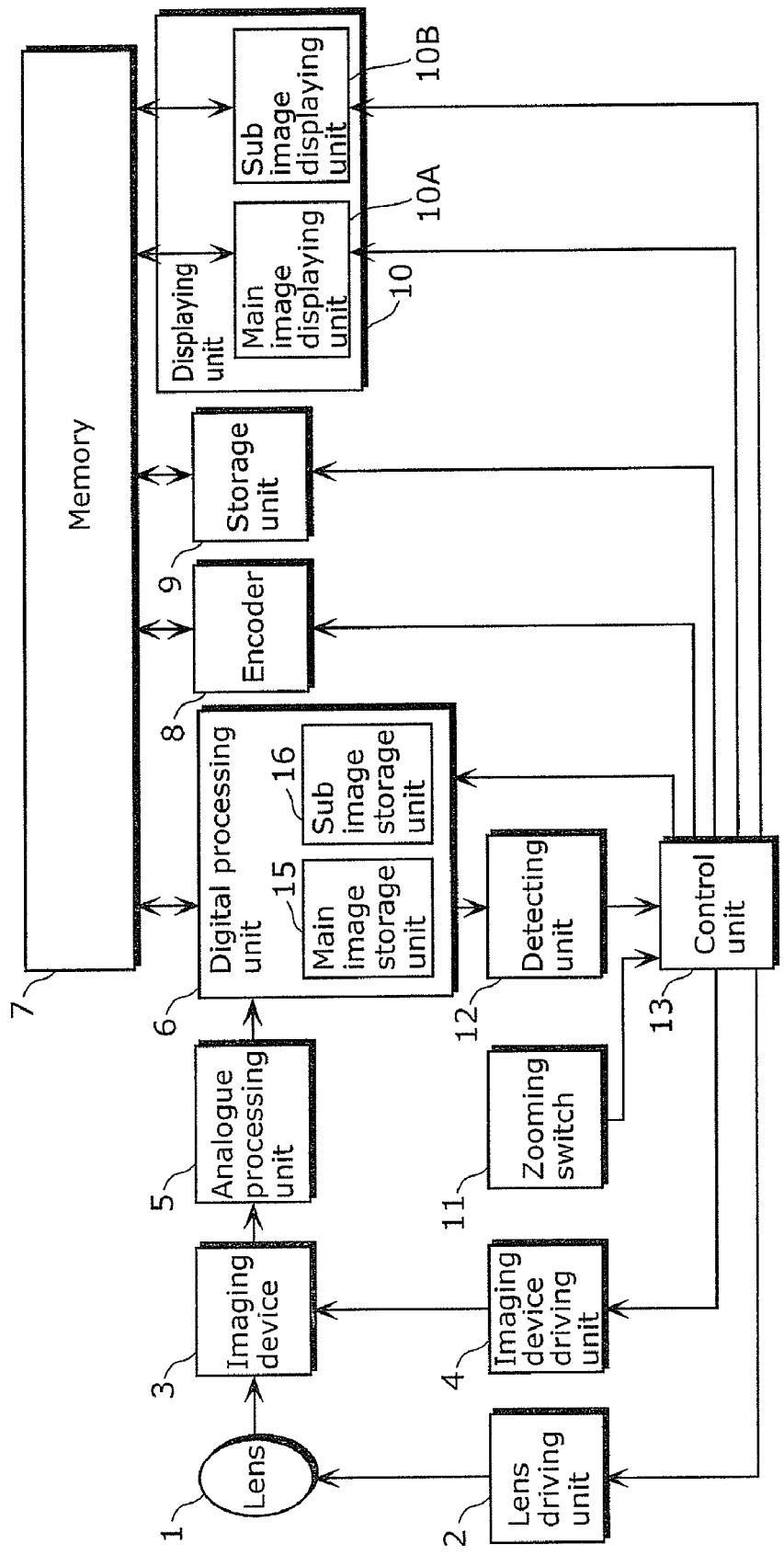
FIG. 15 is a block diagram showing a system structure of an imaging apparatus including two displaying units.

As shown in FIG. 15, the displaying unit 10 may include the following: a main image displaying unit 10A which displays an image of a main image area; and a sub image displaying unit 10B which displays an image of a watch area. This structure makes possible displaying an image of a main image area on the finder and an image of a watch area on the display panel. As a result, the user can capture an object, checking both of the images. This improves user-friendliness of the imaging apparatus.

INDUSTRIAL APPLICABILITY

The present invention introduces imaging apparatuses, and in particular, an imaging apparatus which can obtain images of different areas at once out of an input image provided by a single camera. The present invention is useful in a variety of fields, such as a household video camera, a surveillance camera, and a vehicle-mounted camera.

What is claimed is:

1. An imaging apparatus connected to a memory, said imaging apparatus comprising:
    an imager which reads any given area;
    a main image storage configured to read a first image of a main image area, the first image representing a whole image formed on said imager, and store an image associated with the first image in the memory as a main image;
    a sub image storage configured to read a second image of a watch area from said imager, the watch area being an area to be watched, and store an image associated with the second image in the memory as a sub image;
    an encoder which encodes the main image and the sub image stored in the memory by said main image storage and said sub image storage; and
    a recorder configured to record the main image and the sub image encoded by said encoder on a recording medium,
    wherein said imager obtains images so that an obtainment cycle of said imager is faster than a video frame cycle, and
    said main image storage and said sub image storage are configured to read the images obtained by said imager at different times.

2. The imaging apparatus according to claim 1,
    wherein a first number of pixels which said imager has is greater than a second number of pixels in the main image and a third number of pixels in the sub image,
    said main image storage is configured to convert the first number of pixels included in the first image of the main image area, and to store the image associated with the first image, which has the converted second number of pixels, in the memory as the main image, and
    said sub image storage is configured to convert a fourth number of pixels included in the second image of the watch area, and to store the image associated with second image, which has the converted third number of pixels, in the memory as the sub image.

3. The imaging apparatus according to claim 1,
    wherein said sub image storage is configured to store, in the memory, images of watch areas, including the second image of the watch area as sub images, including the sub image, the sub images corresponding to the watch areas,
    said main image storage and said sub image storage are configured to determine respective reading frame cycles of the first image of the main image area and the second image of the watch area according to a number of the sub images, and store the main image and the sub image in the memory at the determined respective reading frame cycles, and
    said encoder encodes the main image and the sub image at the determined respective reading frame cycles.

4. The imaging apparatus according to claim 1, further comprising:
    an area specifier configured to dynamically specify the watch area.

5. The imaging apparatus according to claim 4,
    wherein said area specifier includes an input having a touch panel, and is configured to specify an area designated by said input as the watch area.

6. The imaging apparatus according to claim 4,
    wherein said area specifier includes a human detector configured to detect a desired person by person recognition and to detect an area of the detected person, and is configured to specify the area detected by said human detector as the watch area.

7. The imaging apparatus according to claim 4,
    wherein said area specifier includes a motion estimator configured to estimate an area in which a motion is estimated by motion estimation, and is configured to specify the area estimated by said motion estimator as the watch area.

8. The imaging apparatus according to claim 4,
    wherein said area specifier includes an eye-gaze detector configured to detect an eye gaze of a user to detect an area at which the user is watching, and is configured to specify the area detected by said eye-gaze detector as the watch area.

9. The imaging apparatus according to claim 4, further comprising:
    a sub image information generator configured to record information indicating the watch area as additional information on the recording medium, the watch area being specified by said area specifier.

10. The imaging apparatus according to claim 9, further comprising
    a display configured to display the first image of the main image area and the second image of the watch area.

11. The imaging apparatus according to claim 10,
    wherein said display is configured to change to display a frame color of a displayed image, of the watch area, corresponding to the sub image depending on whether said recorder records the sub image.

12. The imaging apparatus according to claim 1, further comprising:
    a main image display configured to display the first image of the main image area; and
    a sub image display configured to display the second image of the watch area.

13. The imaging apparatus according to claim 1, further comprising:
    a main image display configured to display the image associated with the first image and stored in the memory as the main image; and
    a sub image display configured to display the image associated with the second image and stored in the memory as the sub image.

14. An imaging apparatus connected to a memory, said imaging apparatus comprising:
    an imager which reads any given area;
    a main image storage configured to read a first image of a main image area, the first image representing a whole image formed on said imager, and store an image associated with the first image in the memory as a main image;
    a sub image storage configured to read a second image of a watch area from said imager, the watch area being an area to be watched, and store an image associated with the second image in the memory as a sub image;
    an encoder which encodes the main image and the sub image stored in the memory by said main image storage and said sub image storage;

a recorder configured to record the main image and the sub image encoded by said encoder on a recording medium; and an area specifier configured to dynamically specify the watch area, wherein said area specifier includes an eye-gaze detector configured to detect an eye gaze of a user to detect an area at which the user is watching, and is configured to specify the area detected by said eye-gaze detector as the watch area.

* * * * *